(12) United States Patent
Yumiki

(10) Patent No.: US 8,736,691 B2
(45) Date of Patent: May 27, 2014

(54) IMAGE PICKUP APPARATUS TO CONTROL AN EXPOSURE TIME BASED ON MOTION OF A DETECTED OPTICAL IMAGE

(75) Inventor: Naoto Yumiki, Osaka (JP)

(73) Assignee: Panasonic Corporation, Osaka (JP)

( * ) Notice: Subject to any disclaimer, the term of this patent is extended or adjusted under 35 U.S.C. 154(b) by 746 days.

(21) Appl. No.: 11/911,927

(22) PCT Filed: Feb. 19, 2007

(86) PCT No.: PCT/JP2007/052979
§ 371 (c)(1),
(2), (4) Date: Oct. 18, 2007

(87) PCT Pub. No.: WO2007/097287
PCT Pub. Date: Aug. 30, 2007

(65) Prior Publication Data
US 2009/0128640 A1  May 21, 2009

(30) Foreign Application Priority Data

Feb. 20, 2006 (JP) ................................. 2006/042379

(51) Int. Cl.
*H04N 5/228* (2006.01)
*G03B 17/00* (2006.01)
*H04N 5/232* (2006.01)

(52) U.S. Cl.
CPC ....... *H04N 5/23248* (2013.01); *H04N 5/23258* (2013.01); *H04N 5/23254* (2013.01)
USPC ...................... 348/208.4; 348/208.99; 396/52

(58) Field of Classification Search
USPC .................. 348/208.99–204.5, 208.4; 396/52
See application file for complete search history.

(56) References Cited

U.S. PATENT DOCUMENTS

| 5,099,322 | A | | 3/1992 | Gove | |
|---|---|---|---|---|---|
| 5,502,484 | A | * | 3/1996 | Okada | 348/208.6 |
| 5,506,912 | A | | 4/1996 | Nagasaki et al. | |
| 5,642,431 | A | | 6/1997 | Poggio | |
| 5,712,474 | A | | 1/1998 | Naneda | |
| 6,148,108 | A | * | 11/2000 | Nishikawa | 382/236 |

(Continued)

FOREIGN PATENT DOCUMENTS

| JP | 4211582 | 8/1992 |
|---|---|---|
| JP | 05-019326 | 1/1993 |

(Continued)

OTHER PUBLICATIONS

International Search Report dated Oct. 14, 2008.

(Continued)

*Primary Examiner* — Twyler Haskins
*Assistant Examiner* — Carramah J Quiett
(74) *Attorney, Agent, or Firm* — Dickinson Wright PLLC

(57) ABSTRACT

Provided is an imaging device capable of reducing image degradation due to a shake of a hand or an object and easily capturing an image of preferable image quality. The imaging device (1) includes: an imaging optical system (L) for forming an optical image of an object; an imaging sensor (4) for receiving the formed optical image and converting it into an electric image signal for output; a motion detecting unit (100) for detecting a motion of an object to be imaged according to the outputted image signal; and a microcomputer (3) for controlling an exposure time in accordance with the motion of the detected optical image of the object.

16 Claims, 12 Drawing Sheets

(56) References Cited

U.S. PATENT DOCUMENTS

| | | | |
|---|---|---|---|
| 6,208,377 B1* | 3/2001 | Morofuji et al. | 348/208.8 |
| 6,778,210 B1 | 8/2004 | Sugahara | |
| 7,030,911 B1 | 4/2006 | Kubo | |
| 7,333,132 B2* | 2/2008 | Shimizu et al. | 348/208.1 |
| 7,639,932 B2* | 12/2009 | Imada | 396/52 |
| 7,889,237 B2 | 2/2011 | Okumura | |
| 8,036,525 B2 | 10/2011 | Lee | |
| 8,228,391 B2* | 7/2012 | Yumiki | 348/208.99 |
| 8,237,803 B2 | 8/2012 | Yumiki | |
| 8,411,155 B2* | 4/2013 | Yumiki | 348/208.4 |
| 2003/0095199 A1 | 5/2003 | Senda | |
| 2004/0207743 A1 | 10/2004 | Nozaki | |
| 2004/0239775 A1* | 12/2004 | Washisu | 348/239 |
| 2004/0239795 A1 | 12/2004 | Kitajima | |
| 2005/0219393 A1 | 10/2005 | Sugimoto | |
| 2005/0231628 A1 | 10/2005 | Kawaguchi | |
| 2005/0265626 A1 | 12/2005 | Endo | |
| 2006/0008173 A1 | 1/2006 | Matsugu | |
| 2006/0098115 A1 | 5/2006 | Toyoda | |
| 2006/0115297 A1 | 6/2006 | Nakamaru | |
| 2006/0140602 A1 | 6/2006 | Kurata | |
| 2006/0165398 A1 | 7/2006 | Imada | |
| 2006/0171697 A1 | 8/2006 | Nojima | |
| 2006/0255986 A1 | 11/2006 | Takanezawa | |
| 2007/0003262 A1 | 1/2007 | Shiratori | |
| 2007/0030375 A1 | 2/2007 | Ogasawara | |
| 2007/0065134 A1 | 3/2007 | Sugimoto | |
| 2007/0110418 A1* | 5/2007 | Imada | 396/55 |
| 2007/0183765 A1 | 8/2007 | Imamura | |
| 2007/0206941 A1 | 9/2007 | Maruyama | |
| 2009/0097832 A1 | 4/2009 | Yumiki | |

FOREIGN PATENT DOCUMENTS

| | | |
|---|---|---|
| JP | 06-027512 | 2/1994 |
| JP | 6165047 | 6/1994 |
| JP | 7107367 | 4/1995 |
| JP | 8327917 | 12/1996 |
| JP | 11-014886 | 1/1999 |
| JP | 11-326980 | 11/1999 |
| JP | 2000-013671 | 1/2000 |
| JP | 2001 013671 | 1/2001 |
| JP | 2001 103366 | 4/2001 |
| JP | 2001-125173 | 5/2001 |
| JP | 2001/245249 | 9/2001 |
| JP | 2001-330882 | 11/2001 |
| JP | 2002040506 | 2/2002 |
| JP | 2002-084453 | 3/2002 |
| JP | 2002-354402 | 12/2002 |
| JP | 2003-107335 | 4/2003 |
| JP | 2003-107555 | 4/2003 |
| JP | 2003/156680 | 5/2003 |
| JP | 2003-222790 | 8/2003 |
| JP | 2003-344891 | 12/2003 |
| JP | 2004-120576 | 4/2004 |
| JP | 2004-320287 | 11/2004 |
| JP | 2005/184246 | 7/2005 |
| JP | 2005-318554 | 11/2005 |
| JP | 2005-347873 | 12/2005 |
| JP | 2006 050149 | 2/2006 |
| JP | 2006-157428 | 6/2006 |
| JP | 2006 157428 | 6/2006 |
| JP | 2006-186481 | 7/2006 |
| JP | 2006/208691 | 8/2006 |
| JP | 2006-270751 | 10/2006 |
| JP | 2007-013272 | 1/2007 |
| JP | 2007-041570 | 2/2007 |
| JP | 2007-82026 | 3/2007 |
| JP | 2007-206583 | 8/2007 |
| JP | 2008-107608 | 5/2008 |
| WO | 2007/055280 | 5/2007 |

OTHER PUBLICATIONS

United States Office Action dated Aug. 3, 2010.
United States Office Action dated Jun. 9, 2010.
Notice of the Reasons for Rejection dated Sep. 6, 2011.
Japanese Office Action dated Jul. 5, 2011.
Extended European Search report dated Feb. 9, 2011.
US Office Action dated Nov. 23, 2010 in U.S. Appl. No. 12/033,103.
USPTO Office Action in U.S. Appl. No. 12/033,103 dated Dec. 1, 2011.
USPTO Office Action in U.S. Appl. No. 12/667,731 dated Jan. 30, 2012.
USPTO Office Action dated Oct. 20, 2011.
USPTO Office Action in U.S. Appl. No. 13/536,114 dated Oct. 3, 2012.
D. Hissink, "Panasonic Lumix DMC FX07," Internet URL: http://www.letsgodigital.org/en/9104/panasonic_lumix_fx07/, Jul. 19, 2006, 3 pages total.
"Panasonic Lumix DMC-FX50 & DMC-FX07," Digital Photography Review, Internet URL: http://www.dpreview.com/news/2006/7/19/panasonicfx50, Jul. 19, 2006, 5 pages total.
"Panasonic Lumix DMC-FX07 Review," Internet URL: http://www.photographyblog.com/reviews_panasonic_lumix_dmc_fx07.php, Nov. 20, 2006, 4 pages total.
USPTO Office Action in U.S. Appl. No. 12/033,087 dated Apr. 6, 2012.
Japanese Interrogation dated Apr. 24, 2012.

* cited by examiner

IMAGE PICKUP APPARATUS TO CONTROL AN EXPOSURE TIME BASED ON MOTION OF A DETECTED OPTICAL IMAGE

TECHNICAL FIELD

The present invention relates to an image pickup apparatus and a lens barrel. More particularly, the present invention relates to an image pickup apparatus and a lens barrel having a camera shake correcting function and a photographing sensitivity change function.

BACKGROUND ART

Image pickup apparatuses such as a digital still camera and digital video camera capable of converting an optical image of a photographing object to an electrical image signal and outputting the image signal (hereinafter simply "digital camera") are rapidly becoming widespread. With reductions in size and weight and escalation in the magnification of optical zooming in recent years in particular, digital cameras are significantly becoming convenient for photographers.

However, together with the reductions in size and weight and escalation in the magnification of optical zooming of digital cameras, a blur may occur in photographed images and may degrade image quality thereof.

Patent Document 1 discloses a digital camera having a blur correction optical system which reduces the influence of image shake on the image upon shot. The digital camera disclosed in Patent Document 1 moves a correction lens up, down, left and right in directions perpendicular to the optical axis, in accordance with the image shake upon shot and corrects the distorting image. It is thereby possible to take a photograph with image shake reduced using even a smaller-sized and lighter-weighted digital camera. Furthermore, the digital camera disclosed in Patent Document 1 need not use a strobe to emit flashlight for a photographing object to prevent image shake, so that it is possible to take a photograph with atmosphere under similar conditions to natural colors.

On the other hand, among causes for degrading the image quality of a photographed image is object shake caused by the motion of a shooting target in addition to camera shake caused by vibration such as hand shake added to the camera body. Such object shake can be prevented by shortening the exposure time and taking a photograph at a high shutter speed. The shutter speed can be made faster by, for example, increasing photographing sensitivity or performing strobe light flashing. Hereinafter, as for an optical image shake of a photographing object on an image pickup plane, one caused by vibration added to the camera body will be referred to as "camera shake", one caused by the motion of a photographing object will be referred to as "object shake", and camera shake and object shake will be generically referred to as "image shake" with respect to the image pickup plane.

Patent Document 2 discloses an apparatus and a method, having a motion prediction section that estimates the motion of a photographing object, that change photographing conditions such as a shutter speed when there is a high possibility that the photographing object may move.

Patent Document 1: Japanese Patent Application Laid-Open No. 2000-13671
Patent Document 2: Japanese Patent Application Laid-Open No. 2006-157428

DISCLOSURE OF INVENTION

Problems to be Solved by the Invention

When photographing sensitivity is increased, an output signal from an image pickup sensor is generally amplified, and thereby noise generated from the image pickup sensor is also amplified. Therefore, an image taken with high sensitivity includes a large amount of noise. In this way, increasing photographing sensitivity more than necessary may cause image quality degradation. Therefore, it is desirable to increase photographing sensitivity when image shake still occurs after making a correction for insufficient ambient brightness using a blur correction optical system or when a photograph of a fast-moving photographing object is taken.

However, with such a conventional image pickup apparatus, it is difficult for photographers to decide whether or not the level of moving speed of the photographing object causes object shake. Therefore, even though it is possible to take a photograph without object shake, photographers who observe the motion of the photographing object may misjudge that object shake will occur. As a result, there is a problem that the photographers change photographing sensitivity to high sensitivity and take a photograph containing an excessively large amount of noise. Furthermore, there is a problem that the photographers need to change photographing sensitivity immediately before taking a photograph and miss the chance to take a photograph.

That is, a general photographer cannot decide what level of motion of the photographing object will or will not cause object shake. In other words, using the camera shake correcting function may result in taking a photograph with object shake when the photographing object is moving fast, and increasing the photographing sensitivity may result in taking a photograph with a large amount of noise when the photographing object is moving slowly. Therefore, a photograph of high quality cannot be obtained.

Furthermore, though the digital camera having a blur correction optical system disclosed in Patent Document 1 can reduce image quality degradation due to camera shake, there has been no proposal of easing image quality degradation due to object shake.

Furthermore, since the digital camera disclosed in Patent Document 2 is intended only to predict the motion of a photographing object and not to decide what level of motion of the photographing object will or will not cause object shake, it is not always possible to take a photograph at an optimal shutter speed in accordance with the object speed.

The present invention has been implemented in view of the above points and it is therefore an object of the present invention to provide an image pickup apparatus and a lens barrel capable of reducing image quality degradation due to camera shake or object shake and easily taking a photograph of high quality.

Means for Solving the Problem

An image pickup apparatus of the present invention employs a configuration having: an image pickup optical system that forms an optical image of a photographing object; an image pickup sensor that receives the formed optical image, converts the optical image to an electrical image signal and outputs the electrical image signal; a motion detecting section that detects a motion of the optical image of the photographing object at a predetermined time before the photographing object is photographed; and a control section that controls an exposure time according to the detected motion of the optical image of the photographing object.

An image pickup apparatus of the present invention used in combination with a lens barrel mounting a camera shake correcting section that corrects a shake of an optical image caused by a motion of the image pickup apparatus, the apparatus employs a configuration having: an image pickup sensor that receives the formed optical image, converts the image to an electrical image signal and outputs the converted signal; a motion detecting section that measures a motion of the optical image of a photographing object at a predetermined time before the photographing object is photographed and calculates an object speed; and a control section that controls an exposure time in accordance with the detected motion of the optical image of the photographing object.

A lens barrel of the present invention used in combination with an image pickup apparatus, the image pickup apparatus employs a configuration having: an image pickup optical system that forms an optical image of a photographing object; an image pickup sensor that receives the formed optical image, converts the image to an electrical image signal and outputs the converted signal; a motion detecting section that measures a motion of the optical image of the photographing object in a predetermined time before the photographing object is photographed and calculates an object speed; and a control section that controls an exposure time in accordance with the detected motion of the optical image of the photographing object, and the lens barrel comprising: a camera shake correcting section that corrects a shake of the optical image caused by the motion of the image pickup apparatus; and an interface between the camera shake correcting section and a control section of the image pickup apparatus.

Advantageous Effect of the Invention

According to the present invention, it is possible to provide an image pick up apparatus whereby image quality degradation due to hand shake or object shake is reduced and whereby an image of high quality is easily photographed.

BEST MODE FOR CARRYING OUT THE INVENTION

Embodiments of the present invention will be explained below in detail with reference to the accompanying drawings.

Embodiment 1

Figure 1:
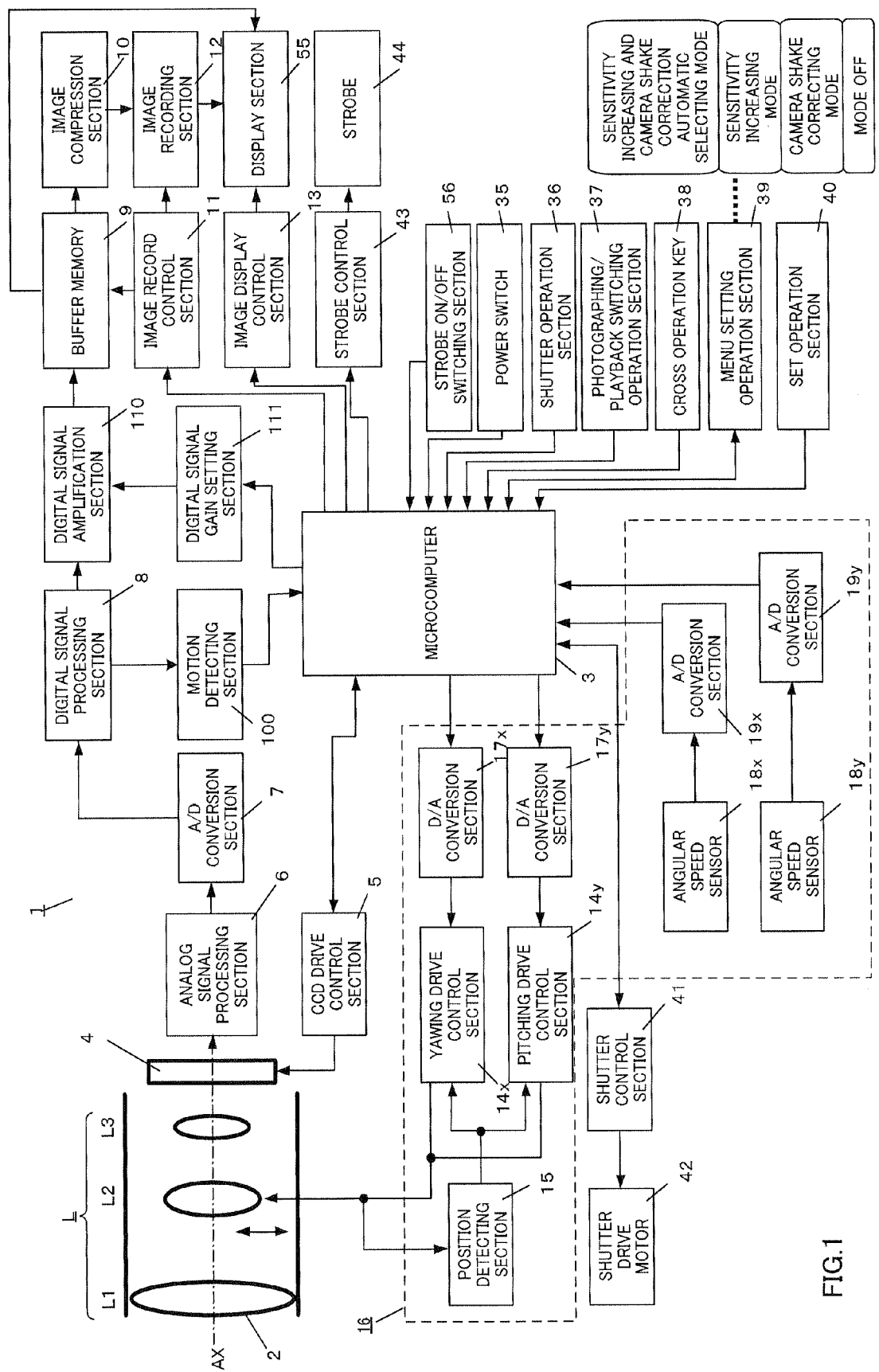
FIG. 1 is a block diagram showing a configuration of an image pickup apparatus according to Embodiment 1 of the present invention.
Figure 2A:
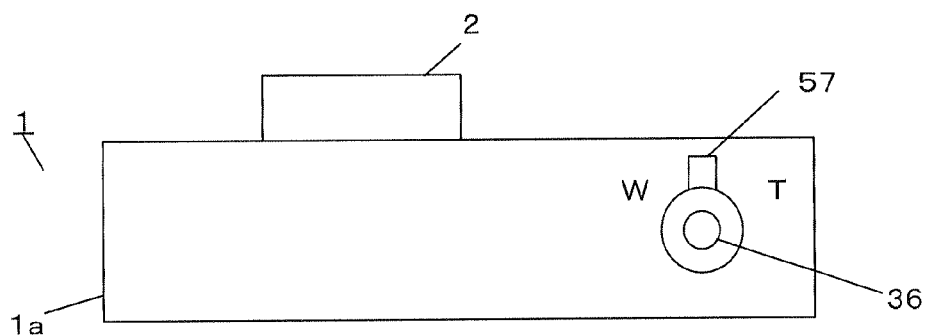
FIG. 2A is a top view showing a schematic configuration of an image pickup apparatus according to Embodiment 1.
Figure 2B:
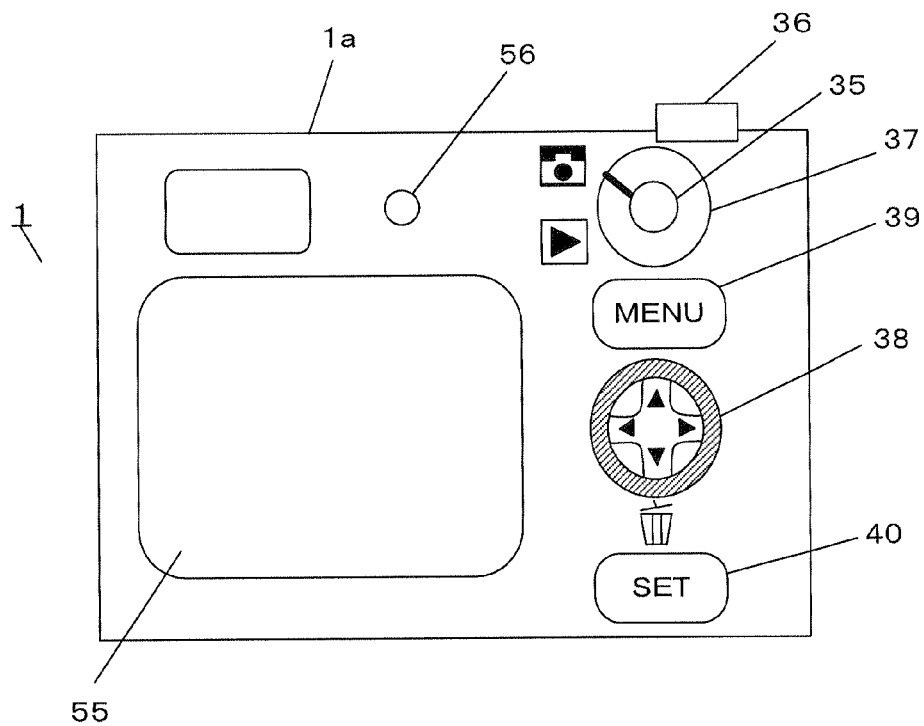
FIG. 2B is a rear view showing a schematic configuration of the image pickup apparatus according to Embodiment 1.

FIG. 1 is a block diagram showing the configuration of an image pickup apparatus according to an embodiment of the present invention. FIG. 2 illustrates the schematic configuration of the image pickup apparatus according to the present embodiment, where FIG. 2A shows a top view and FIG. 2B shows a rear view. The present embodiment is an example where the present invention is applied to a digital camera having a camera shake correcting function and a photographing sensitivity change function. In the following explanation, the "moving speed" of a photographing object (also referred to as "object speed") is the moving speed of the optical image of the photographing object on the image pickup plane, caused by one of or both of camera shake and object shake.

In FIG. 1, digital camera 1 employs a configuration having image pickup optical system L, microcomputer 3, image pickup sensor 4, CCD (Charge Coupled Device) drive control section 5, analog signal processing section 6, A/D conversion section 7, digital signal processing section 8, buffer memory 9, image compression section 10, image record control section 11, image recording section 12, image display control section 13, camera shake correcting section 16, angular velocity sensor 18, display section 55, shutter control section 41, shutter drive motor 42, strobe control section 43, strobe 44, motion detecting section 100, digital signal amplification section 110 and digital signal gain setting section 111.

Image pickup optical system L is an optical system including three lens groups L1, L2 and L3. First lens group L1 and second lens group L2 perform zooming by moving in the direction of the optical axis. Second lens group L2 is a correction lens group and corrects the motion of an image by moving within the plane perpendicular to the optical axis and thereby decentering the optical axis. Third lens group L3 performs focusing by moving in the direction of the optical axis. Image pickup optical system L is not limited to the configuration of the above-described optical system.

When mechanical vibration or shaking by a photographer is added to digital camera 1, a difference is produced between the optical axis of light irradiated from the photographing object to the lens and the optical axis of the lens, and thereby a blurred image is formed. Therefore, digital camera 1 has camera shake correcting section 16 and camera shake correcting mechanism 20 to prevent a blurred image from being formed. Camera shake correcting section 16 and camera shake correcting mechanism 20 are intended to reduce the optical image shake caused by the photographer's shake and vibration added to the camera body, for example.

Image pickup sensor 4 is, for example, a CCD sensor that converts the optical image formed by image pickup optical system L to an electric signal. Image pickup sensor 4 is driven and controlled by CCD drive control section 5. Image pickup sensor 4 may be the CMOS (Complementary Metal Oxide Semiconductor) sensor.

Microcomputer 3 controls whole digital camera 1 and also performs photographing control processing of controlling a camera shake correcting function and an photographing sensitivity change function in accordance with the motion of the photographing object. When the object speed is lower than a predetermined threshold, microcomputer 3 controls the camera shake correcting function and operates the camera shake correction, and, when the object speed is equal to or higher than the predetermined threshold, microcomputer 3 increases the gain of the photographing sensitivity change function and shortens the exposure time compared to a case where the object speed is lower than the predetermined threshold, and takes a plurality of images continuously under different exposure conditions. Details of the photographing control processing will be described later according to the flowchart in FIG. 6. Furthermore, microcomputer 3 can receive signals from power switch 35, shutter operation section 36, photographing/playback switching operation section 37, cross operation key 38, MENU setting operation section 39 and SET operation section 40, respectively. Microcomputer 3 is an example of the control section of the present invention.

In FIG. 2, casing 1a of digital camera 1 is supported by the photographer or the like when an image of the photographing object is photographed. Display section 55, power switch 35, photographing/playback switching operation section 37, cross operation key 38, MENU setting operation section 39 and SET operation section 40 are provided on the back of casing 1a.

Power switch 35 is an operation member for turning ON/OFF the power of digital camera 1. Photographing/playback switching operation section 37 is an operation member for switching between an photographing mode and a playback mode, and the photographer can switch between the modes by turning a lever. MENU setting operation section 39 is an operation member for setting various operations of digital camera 1. Cross operation key 38 is an operation member where the photographer presses up, down, left and right parts and selects a desired menu from various menu screens displayed on display section 55. SET operation section 40 is an operation member for returning various menu displays to the previous display.

In FIG. 2B, shutter operation section 36 and zoom operation section 57 are provided on the top surface of casing 1a. Zoom operation section 57 is provided around shutter operation section 36 and is pivotable coaxially with shutter operation section 36. When the photographer operates photographing/playback switching operation section 37, switches the mode to the photographing mode and turns zoom operation section 57 clockwise, the lens group moves toward the telephoto side, and, when the photographer turns zoom operation section 57 counterclockwise, the lens group moves toward the wide-angle side.

Shutter operation section 36 is, for example, a release button operated by the photographer when a photograph is taken. When shutter operation section 36 is operated, a timing signal is outputted to microcomputer 3. Shutter operation section 36 is a two-stage push-down switch allowing half-pressing operation and full-pressing operation, and, when the photographer performs half-pressing operation, shutter operation section 36 starts detection of motion of the photographing object, photometric processing and distance measuring processing, which will be described later. When the photographer performs full-pressing operation, a timing signal is outputted. Shutter control section 41 drives shutter drive motor 42 according to a control signal outputted from microcomputer 3 which has received a timing signal and makes the shutter operate.

Returning to FIG. 1 again, the explanation of the configuration of digital camera 1 will be continued. In FIG. 1, strobe control section 43 controls the operation of strobe 44. Microcomputer 3, which has received a timing signal through the operation of shutter operation section 36, outputs a control signal to strobe control section 43. Strobe control section 43 makes strobe 44 emit light based on the control signal. Strobe 44 is controlled according to the light quantity received by image pickup sensor 4. That is, when the output of the image signal from image pickup sensor 4 is equal to or below a predetermined value, strobe control section 43 makes strobe 44 automatically emit light work with the shutter operation. By contrast, when the output of the image signal is equal to or above the predetermined value, strobe control section 43 controls strobe 44 so as not to emit light.

Strobe ON/OFF operation section 56 is intended to set the operation of strobe 44 irrespective of the output of above-described image pickup sensor 4. That is, strobe control section 43 makes strobe 44 emit light when strobe ON/OFF operation section 56 is "ON" and does not make strobe 44 emit light when strobe ON/OFF operation section 56 is "OFF".

The image signal outputted from image pickup sensor 4 is sent from analog signal processing section 6 to A/D conversion section 7, digital signal processing section 8, digital signal amplification section 110, buffer memory 9 and image compression section 10 in sequence and processed. Analog signal processing section 6 applies analog signal processing such as gamma processing to the image signal outputted from image pickup sensor 4. A/D conversion section 7 converts an analog signal outputted from analog signal processing section 6 to a digital signal. Digital signal processing section 8 applies digital signal processing such as noise cancellation and contour emphasis to the image signal converted to the digital signal by A/D conversion section 7 and outputs the signal to motion detecting section 100 and digital signal amplification section 110. Buffer memory 9 is a RAM (Random Access Memory) and stores the image signal temporarily.

Digital signal gain setting section 111 sets an amplification gain of the image signal after digital signal processing. Digital signal amplification section 110 amplifies the image signal using the set amplification gain and outputs the signal to buffer memory 9. The setting of the amplification gain corresponds to the setting of photographing sensitivity. In the present embodiment, photographing sensitivity is expressed in values equivalent to ISO sensitivity and can be set to photographing sensitivity of ISO80, 100, 200, 400, 800 and 1600 equivalent, for example. Here, the photographing sensitivity that can be set is not limited to the above example. Furthermore, the photographing sensitivity may be expressed in values other than ISO sensitivity equivalent.

Furthermore, the processing of amplifying an image signal is not limited to the case of processing performed by digital signal amplification section 110 and may also be performed on an analog signal by analog signal processing section 6. Furthermore, the amplification processing may also be performed by image pickup sensor 4.

The image signal stored in buffer memory 9 is sent from image compression section 10 to image recording section 12 in sequence and processed. The image signal stored in buffer memory 9 is read out by a command from image record control section 11 and transmitted to image compression section 10. Data of the image signal transmitted to image compression section 10 is performed compression processing to the image signal according to a command from image record control section 11. Through this compression processing, the image signal is reduced in data size compared to the original data. For example, the JPEG (Joint Photographic Experts Group) scheme is used as the compression method. After that, the compressed image signal is recorded in image recording section 12 by image record control section 11.

Image recording section 12 is, for example, an inner memory and/or a detachable removable memory that records the image signal in association with predetermined information to be recorded, based on the command of image record control section 11. Predetermined information to be recorded together with the image signal includes date and time when the image was taken, focal length information, shutter speed information, F-number information and photographing mode information, and the predetermined information is, for example, in the Exif (registered trademark) format or a similar format to the Exif (registered trademark) format.

Display section 55 displays an image signal recorded in image recording section 12 or buffer memory 9 as a visible image, based on a command from image display control section 13. Here, the display mode of display section 55 includes a display mode where only an image signal is displayed as a visible image and a display mode where an image signal and information upon shot are displayed as a visible image. Motion detecting section 100 detects a vector (hereinafter a "motion vector") showing the amount of position shift in the horizontal/vertical direction of an image between frames, based on an image signal converted to a digital signal, on a per frame basis. Hereinafter, the details of motion detecting section 100 will be explained.

Figure 3:
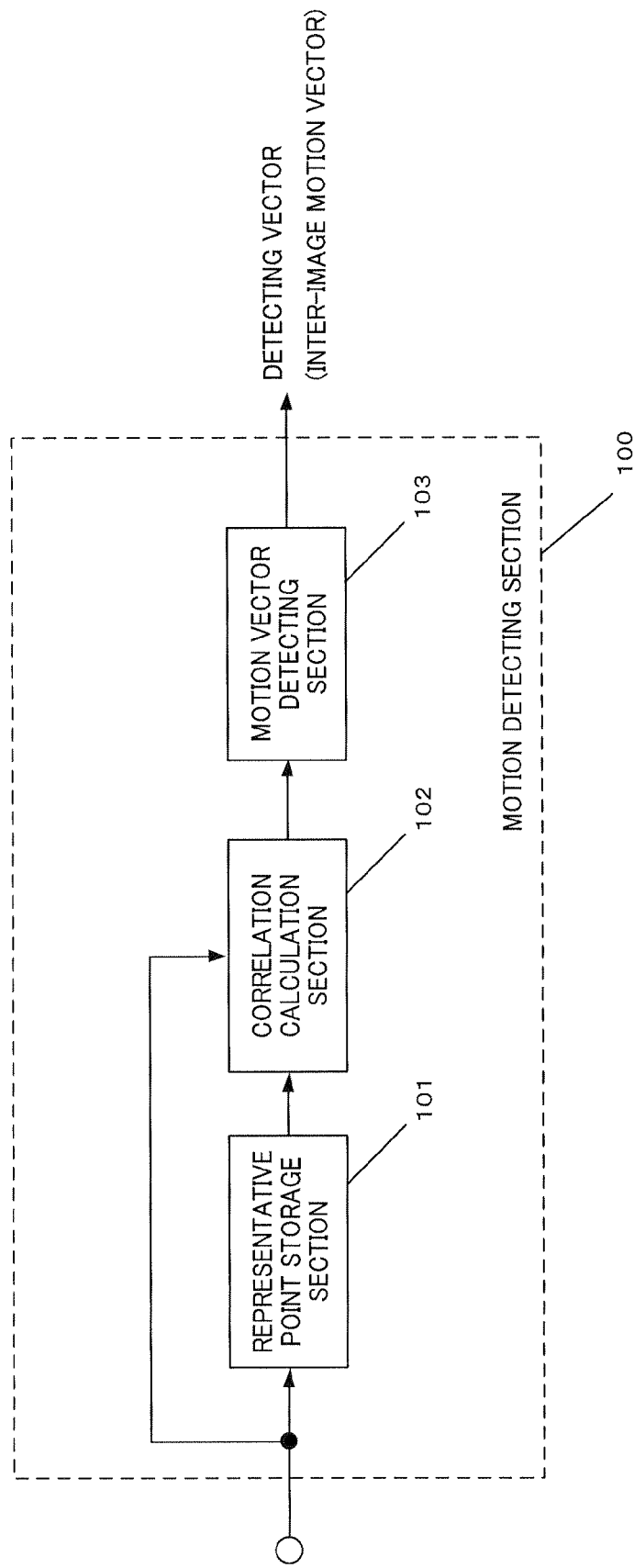
FIG. 3 is a block diagram showing an example of a configuration of a motion detecting section of the image pickup apparatus according to Embodiment 1.

FIG. 3 is a block diagram showing an example of the configuration of above-described motion detecting section 100. In FIG. 3, motion detecting section 100 employs the configuration having representative point storage section 101, correlation calculation section 102 and motion vector detecting section 103.

Representative point storage section 101 divides an image signal of a current frame inputted via A/D conversion section 7 and digital signal processing section 8 into a plurality of areas and stores image signals corresponding to specific representative points included in the plurality of areas as representative point signals. Furthermore, representative point storage section 101 reads out representative point signals of one frame earlier from the already stored current frame, and outputs the signals to correlation calculation section 102. Correlation calculation section 102 performs a correlation calculation that calculates a difference between the representative point signals of the previous frame and the representative point signals of the current frame. A result of the calculation is outputted to motion vector detecting section 103.

Motion vector detecting section 103 detects a motion vector of an image between the previous frame and the current frame by one pixel from a result of the calculation by correlation calculation section 102. The motion vector is then outputted to microcomputer 3. Microcomputer 3 adjusts a gain and a phase with respect to the motion vector and calculates the moving speed and the direction of the photographing object on the image signal per unit time.

The processing of detecting the motion of the photographing object is started by, for example, the photographer half-pressing shutter operation section 36. The start of the processing may also work with the operation where the photographer turns ON power switch 35 and switches to the photographing mode by operating photographing/playback switching operation section 37.

Next, the configuration of camera shake correcting section 16 which realizes a camera shake correcting function will be explained. Camera shake correcting section 16 includes position detecting section 15, yawing drive control section 14x, pitching drive control section 14y, D/A conversion sections 17x and 17y, angular velocity sensors 18x and 18y and A/D conversion sections 19x and 19y.

Yawing drive control section 14x and pitching drive control section 14y drive correction lens group L2 in two directions perpendicular to optical axis AX of image pickup optical system L. Position detecting section 15 detects the position of correction lens group L2. Above-described position detecting section 15, yawing drive control section 14x and pitching drive control section 14y form a feedback control loop for driving and controlling correction lens group L2.

Angular velocity sensors 18x and 18y are the sensors which detect the motion of digital camera 1 itself including image pickup optical system L. Angular velocity sensors 18x and 18y output positive and negative angular velocity signals in accordance with the direction where the digital camera moves, based on the output in a state where digital camera 1 is still. In the present embodiment, two angular velocity sensors are provided for detecting the two directions of the yawing direction and the pitching direction.

The outputted angular velocity signal is converted to a digital signal by A/D conversion sections 19x and 19y via the filter processing or amplifier processing and provided to microcomputer 3. Microcomputer 3 applies filtering, integration processing, phase compensation, gain adjustment or clip processing to the angular velocity signal in sequence, calculates the amount of drive control of lens group L2 required for camera shake correction and outputs a result of the calculation as a control signal. Such a control signal is outputted to yawing drive control section 14x and pitching drive control section 14y through D/A conversion sections 17x and 17y.

Yawing drive control section 14x and pitching drive control section 14y drive correction lens group L2 by a predetermined amount of drive, based on a control signal. It is thereby possible to correct camera shake and reduce image quality degradation.

Figure 4:
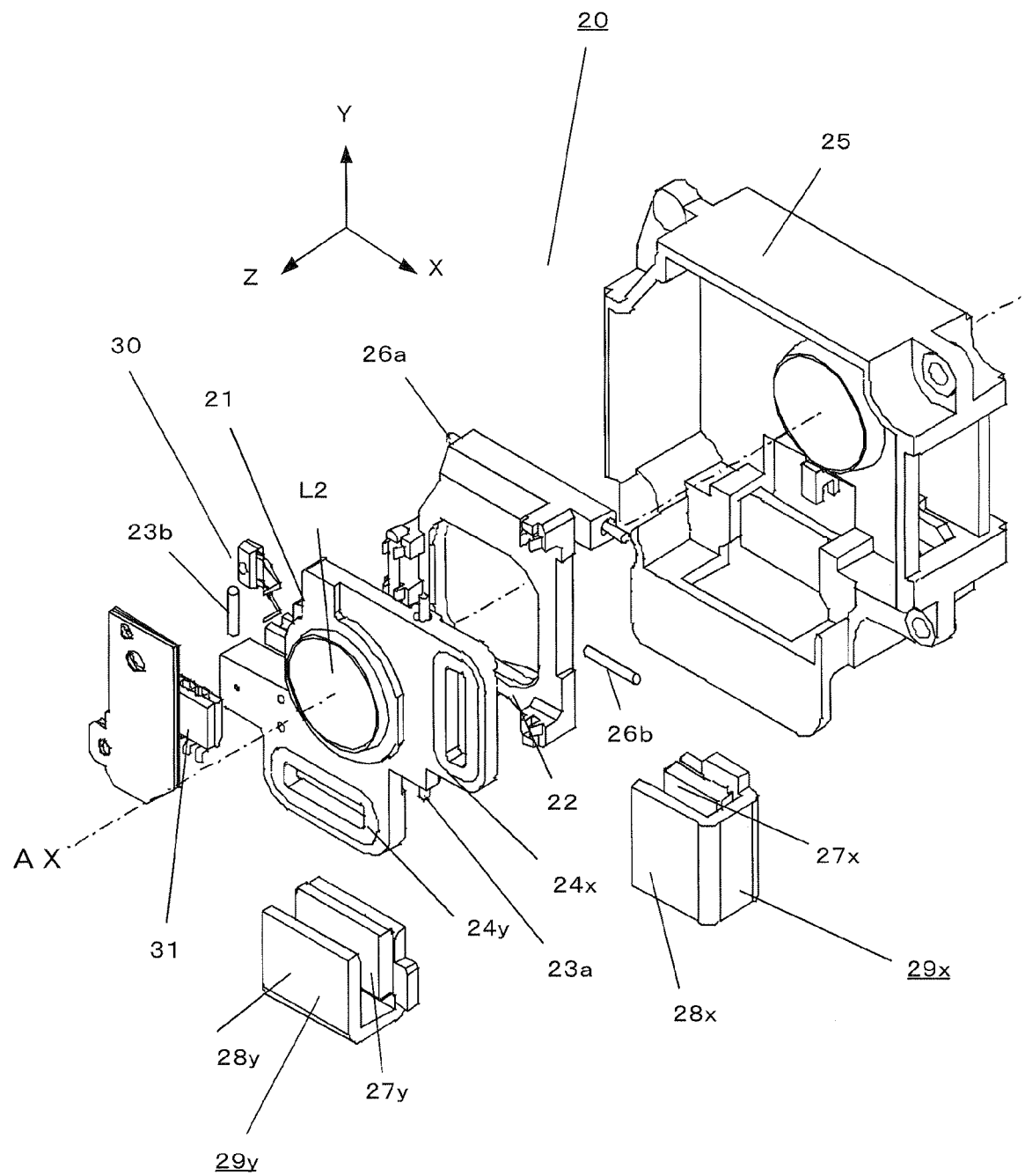
FIG. 4 is an exploded perspective view showing a configuration of a camera shake correcting mechanism incorporated in the camera shake correcting section of the image pickup apparatus according to Embodiment 1.

FIG. 4 is an exploded perspective view showing the configuration of camera shake correcting mechanism 20 incorporated in above described camera shake correcting section 16.

Camera shake correcting mechanism 20 employs a configuration mainly having pitch motion frame 21, yawing motion frame 22, pitching shafts 23a and 23b, coils 24x and 24y, yokes 28x and 28y, actuators 29x and 29y, light-emitting element 30 and light-receiving element 31.

Correction lens group L2 is fixed to pitch motion frame 21. Pitching move frame 21 is held to be slidable in the Y direction to yawing move frame 22 through two pitching shafts 23a and 23b. Furthermore, coils 24x and 24y are fixed to pitching move frame 21. Yawing move frame 22 is held to be slidable in the X direction to fixed frame 25 through yawing shafts 26a and 26b. Magnet 27x and yoke 28x are held to fixed frame 25 and configure actuator 29x with coil 24x. In the same way, magnet 27y and yoke 28y are held to fixed frame 25 and configure actuator 29y with coil 24y. Light-emitting element 30 is fixed to pitching move frame 21. Furthermore, light-receiving element 31 is fixed to fixed frame 25, receives projection light of light-emitting element 30 and detects a two-dimensional position coordinate. Such light-emitting element 30 and light-receiving element 31 configure above-described position detecting section 15.

The operation of digital camera 1 having a camera shake correcting function and a photographing sensitivity change function configured as shown above will be explained below.

First, selectable photographing modes of digital camera 1 will be explained. The photographing modes include, for example, an "continuous shooting mode" where shutter drive motor 42 is operated at 0.3-second intervals and photographing is performed continuously two or a plurality of times, "sensitivity increasing and camera shake correction automatic selecting mode", "sensitivity increasing mode" and "camera shake correcting mode", which will be described later, and the photographer can select a desired photographing mode. When an photographing mode is selected, microcomputer 3 controls various control sections according to the photographing mode.

Figure 5:
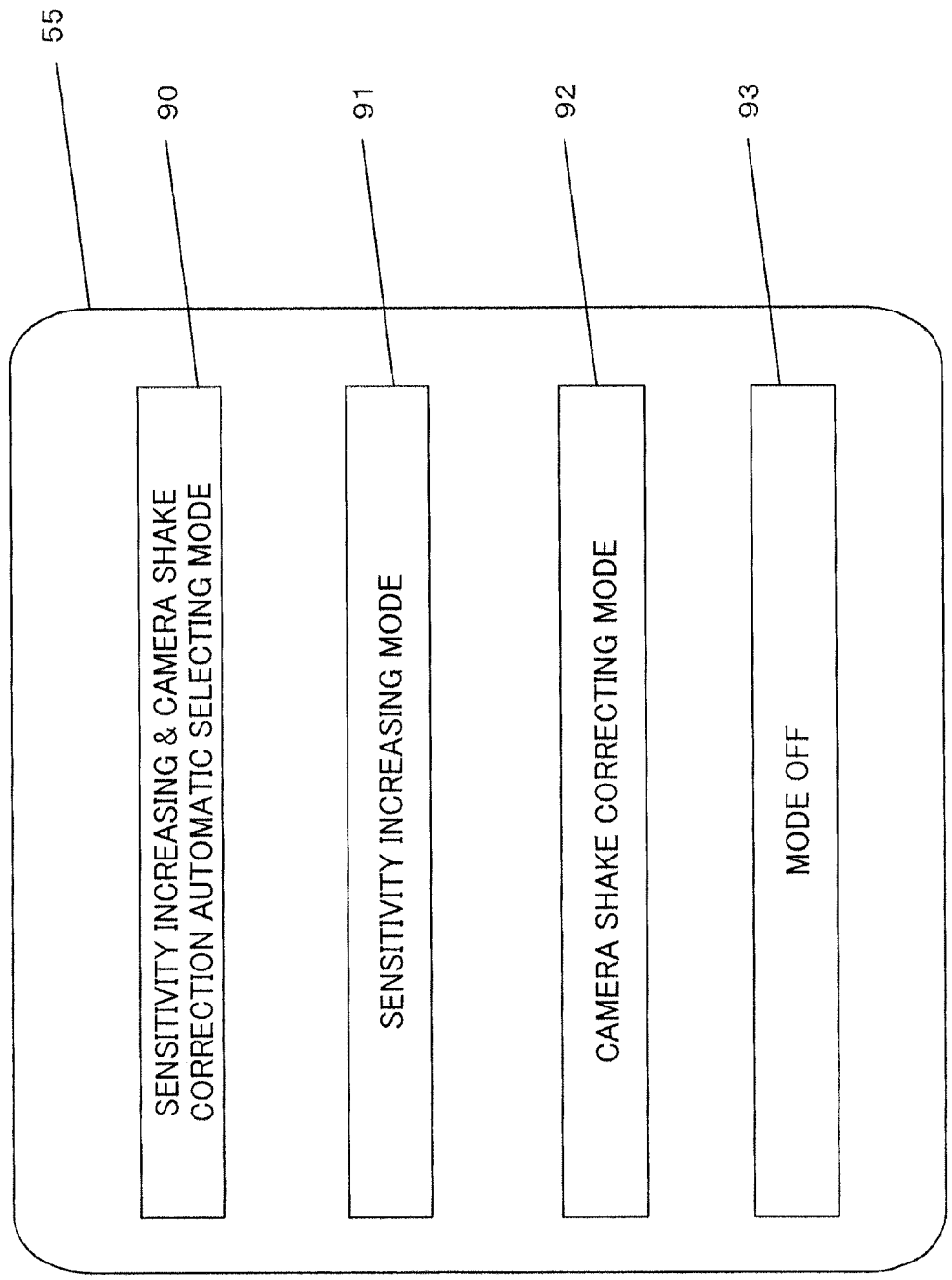
FIG. 5 shows a display example of the photographing mode selecting screen displayed on the display section of the image pickup apparatus according to Embodiment 1.

FIG. 5 illustrates a display example of an photographing mode selecting screen displayed on display section 55. The photographing mode selecting screen can be displayed on display section 55 by the photographer operating MENU setting operation section 39 or cross operation key 38. As shown in FIG. 5, the photographing mode provides "sensitivity increasing and camera shake correction automatic selecting mode", "sensitivity increasing mode", "camera shake correcting mode" and "mode OFF", and the photographer can set a desired photographing mode by selecting corresponding icons 90 to 93. FIG. 5 shows only characteristic photographing mode selecting icons in the present embodiment, but the selecting icons of other photographing mode such as the above-described "continuous shooting mode" may also be further displayed.

When sensitivity increasing mode selecting icon 91 is selected, photographing sensitivity is changed to higher sensitivity than that the sensitivity of normal photographing ("sensitivity increasing mode"). That is, digital signal amplification section 110 amplifies an image signal at a predetermined gain according to a command from microcomputer 3. In this way, it is possible to shorten the exposure time and take a photograph at a higher shutter speed, and thereby reduce the influence of image shake.

When camera shake correcting mode selecting icon 92 is selected, the camera shake correcting function operates ("camera shake correcting mode"). That is, camera shake correcting mechanism 20 reduces camera shake by driving correction lens group L2 in two directions within a plane perpendicular to the optical axis according to a command from microcomputer 3.

When sensitivity increasing and camera shake correction automatic selecting mode icon 90 is selected, microcomputer 3 automatically switches to either of "sensitivity increasing mode" or "camera shake correcting mode" according to the moving object speed. In this way, when the photographing object moves at a speed that causes object shake, high photographing sensitivity is set, while when the photographing object moves at a low speed that does not cause object shake, the camera shake correcting function which reduces image shake due to camera shake operates.

When mode OFF selecting icon 93 is selected, the above-described photographing sensitivity increasing function and the camera shake correcting function do not operate and normal photographing is possible in a normal mode. Next, the photographing processing when the "sensitivity increasing and camera shake correction automatic selecting mode" is selected, will be explained using the flowchart in FIG. 6.

Figure 6:
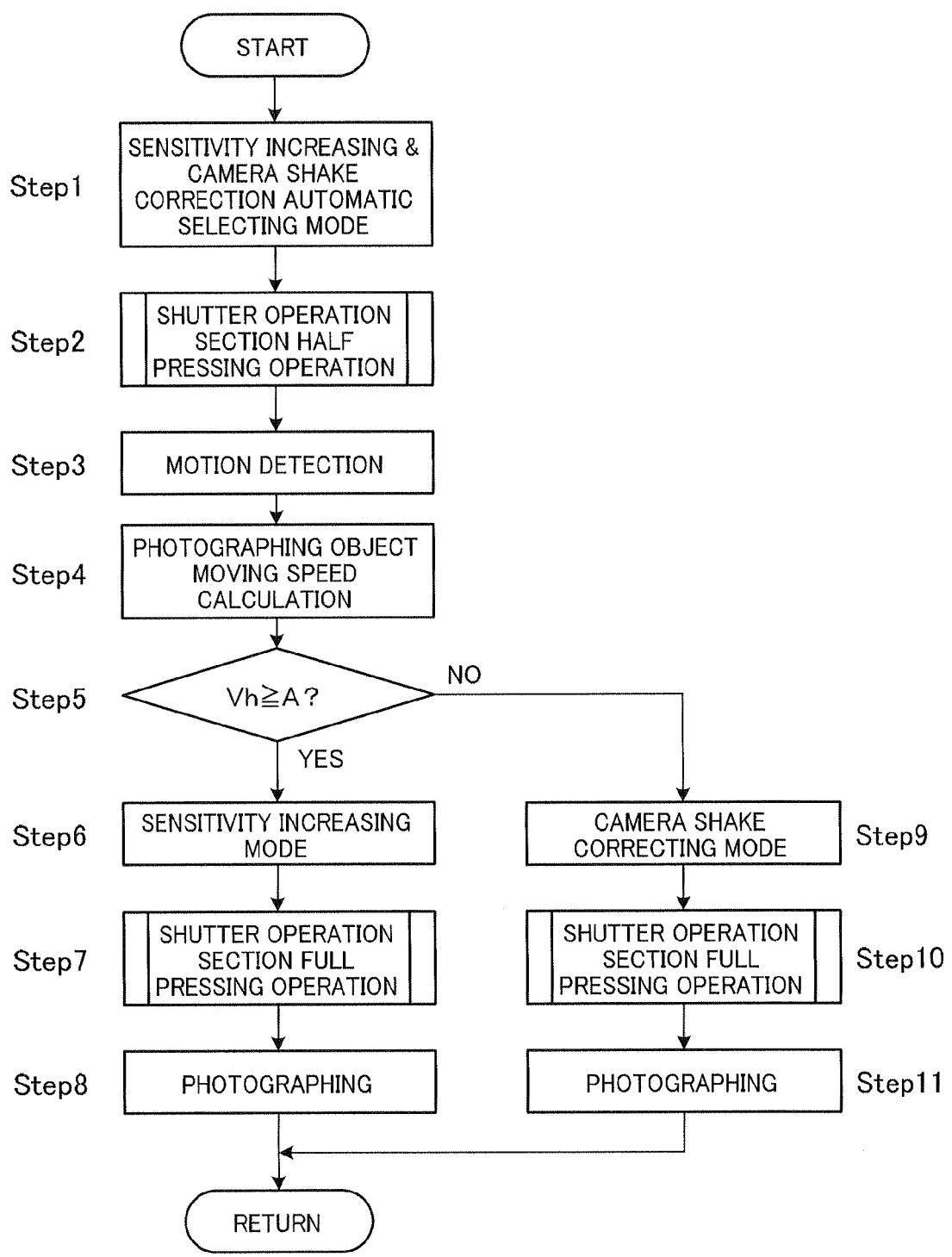
FIG. 6 is a flow chart showing photographing processing by the image pickup apparatus according to Embodiment 1.

FIG. 6 is a flowchart showing the photographing processing of digital camera 1 and is executed by microcomputer 3. This flow starts when power switch 35 of digital camera 1 is operated on the ON side.

In the processing in step 1, when the photographer operates MENU setting operation section 39 provided on the back side of casing 1a of digital camera 1, a list of photographing modes is displayed on display section 55. Furthermore, when the photographer selects sensitivity increasing and camera shake correction automatic selecting mode icon 90 out of the displayed photographing mode selecting icons, the flow proceeds to step 2.

In step 2, it is recognized that the photographer like operated shutter operation section 36 and microcomputer 3 makes the flow proceed to step 3.

In step 3, the motion of the photographing object is detected. In the motion detecting processing, motion detecting section 100 detects the motion of the shooting target by tracking representative points of the photographed image and outputs a motion vector. Furthermore, photometric measuring processing and distance measuring processing are performed at the same time with the motion detecting processing. In the photometric measuring processing, digital signal processing section 8 calculates an exposure value based on the image signal outputted from image pickup sensor 4. Microcomputer 3 automatically sets an appropriate shutter speed and ISO sensitivity indicating photographing sensitivity based on the calculated exposure value. Furthermore, in the distance measuring processing, a focus control section (not shown) moves the lens group in the direction of the optical axis and adjusts focusing so that the contrast value of the image signal reaches a peak. Furthermore, motion detecting section 100 detects the motion of the shooting target and outputs a motion vector.

In step 4, microcomputer 3 calculates moving speed Vh of the photographing object per unit time from the motion vector detected by motion detecting section 100.

In step 5, moving speed Vh is decided. There is predetermined value A in digital camera 1, and microcomputer 3 compares moving speed Vh with predetermined value A. Here, predetermined value A represents the threshold at which object shake occurs, and may be a value peculiar to the camera or may be arbitrarily set by the photographer. For example, when a strobe is used, the shutter speed can be made faster and the photographing sensitivity does not increase beyond necessity by increasing the threshold. On the contrary, when taking a photograph of a child or pet who/which is likely to suddenly move after the object speed is calculated, before the photograph is taken, it is also possible to use a method whereby digital camera 1 is provided with a child photographing mode or pet photographing mode separately, so that, when the photographer selects these modes, the threshold is decreased and priority is given to increasing photographing sensitivity.

Moreover, when taking a photograph of a night view or a photograph in a dark room, when the distance to the photographing object is too far for the strobe light to reach or when the focal distance is long and the influence of camera shake is large as in the case of telephotography, it is also possible to reduce the threshold and give priority to photographing sensitivity. As a result of the comparison, when moving speed Vh is equal to or greater than value A, microcomputer 3 decides that the photographing object is moving at a speed that causes object shake and the flow proceeds to step 6. When moving speed Vh is smaller than value A, microcomputer 3 decides that object shake does not occur and the flow proceeds to step 9. In a situation where no object shake occurs, a photograph is taken at the shutter speed and ISO sensitivity set in step 3. For example, it is assumed that ISO sensitivity is 100 equivalent and a photograph is taken at a shutter speed of $1/30$ second.

When moving speed Vh is equal to or higher than value A in step 5, microcomputer 3 switches the photographing mode to a "sensitivity increasing mode" in step 6. That is, digital signal gain setting section 111 sets a gain in and after step 6, so that ISO sensitivity becomes higher than the ISO sensitivity set in step 3.

When it is recognized in step 7 that the photographer has fully pressed the shutter operation section, photographing processing is carried out in step 8. That is, an optical image of the photographing object is formed on image pickup sensor 4 and image pickup sensor 4 outputs the image signal. Digital signal amplification section 110 then amplifies the image signal outputted from digital signal processing section 8 at the gain set in step 6. The amplified image signal is recorded in image recording section 12 and photographing processing ends.

In this way, when moving speed Vh of the photographing object is greater than predetermined value A, high photographing sensitivity is set. It is thereby possible to shorten the exposure time, realize photographing at a high shutter speed and thereby prevent object shake.

By contrast, when moving speed Vh is smaller than value A in step 5 above, microcomputer 3 changes the photographing mode to a "camera shake correcting mode" in step 9 and makes camera shake correcting section 16 and camera shake correcting mechanism 20 operate. Camera shake correcting section 16 detects camera shake occurring on the camera body through angular velocity sensors 18x and 18y. Under a command from microcomputer 3, a current is supplied to coils 24x and 24y of pitching move frame 21 from an external circuit and the magnetic circuit formed of actuators 27x and 27y makes pitching move frame 21 and correction lens group L2 move in two directions X and Y within the plane perpendicular to optical axis AX. In this case, light-receiving element 29 detects the position of pitching move frame 21, thereby implementing position detection with high accuracy.

At step 11, when microcomputer 3 recognizes that the photographer has fully pressed shutter operation section 36, microcomputer 3 performs photographing processing in step 11. That is, a photographing object image is formed on image pickup sensor 4, an image signal thereof is outputted and the outputted image signal is displayed on display section 55.

In this way, when moving speed Vh of the photographing object is smaller than predetermined value A, the photographing sensitivity is not changed and the camera shake correcting function operates. It is thereby possible to reduce camera shake and take a photograph of good quality.

As described above, when the photographing object moves fast, the digital camera according to the present embodiment changes photographing sensitivity to high sensitivity, shortens the exposure time and takes a photograph at a high shutter speed, thereby preventing image quality degradation due to object shake. Furthermore, when the photographing object moves slowly, the digital camera according to the present embodiment makes the camera shake correcting function operate, and can prevent image shake caused by camera shake and reduce image quality degradation.

Furthermore, when the photographing object moves fast, the digital camera according to the present embodiment automatically changes photographing sensitivity to high sensitivity and the photographer need not observe the motion of the photographing object to decide whether or not object shake occurs, and therefore the digital camera has a high degree of convenience.

Furthermore, when the detected moving object speed is higher than a predetermined value, the digital camera according to the present embodiment changes photographing sensitivity to high sensitivity. This prevents the photographer from mistakenly setting photographing sensitivity to high sensitivity even though the photographing object is moving at a speed that causes no object shake.

Although a case has been described with the present embodiment where a digital camera changes photographing sensitivity to high sensitivity when moving speed Vh of the photographing object is higher than predetermined value A, the present invention is not limited to this case. The digital camera may change the photographing sensitivity to high sensitivity and operate a camera shake correcting function.

Embodiment 2

Next, the digital camera according to Embodiment 2 will be explained. Although the digital camera according to the present embodiment has a similar basic configuration to the digital camera according to Embodiment 1, the digital camera differs in that a panning shot mode is further selectable as an photographing mode. Here, "panning shot" is a method whereby, when a fast moving photographing object is photographed, a photograph is taken by pressing shutter operation section 36 while the orientation of the camera is moved in the traveling direction, and it is possible to take a photograph by taking a photograph in the panning shot mode as if the photographing object is still and the background is flowing. In the present embodiment, the same components as those of Embodiment 1 are assigned the same reference numerals and explanations will be focused on differences from Embodiment 1.

Figure 7:
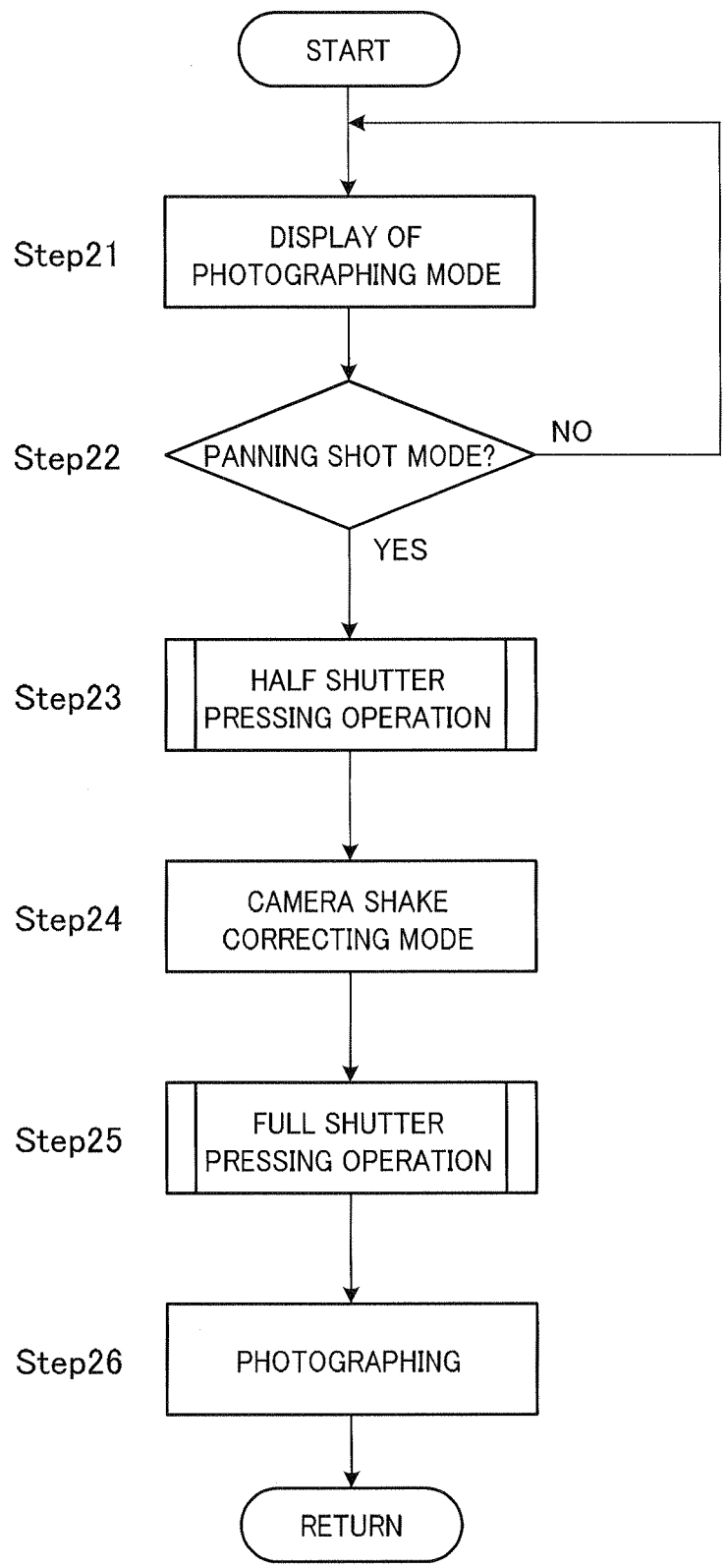
FIG. 7 is a flow chart showing photographing processing by an image pickup apparatus according to Embodiment 2 of the present invention.

FIG. 7 is a flowchart showing photographing processing of the digital camera according to Embodiment 2. The processing disclosed in FIG. 7 is started when power switch 35 of digital camera 1 is operated to the ON side.

First, in the processing at step 21, when the photographer operates MENU setting operation section 39, a list of selectable photographing modes is shown on display section 55. As the photographing mode displayed in the present embodiment, a panning shot mode is further selectable in addition to the modes described in Embodiment 1.

At step 22, when the photographer selects a panning shot mode selection icon, the photographing mode is set to the panning shot mode. Next, at step 23, when the photographer presses shutter operation section 36 halfway, photometric processing and distance measuring processing are carried out, and, at step 24, microcomputer 3 gives a command to camera shake correcting section 16 and camera shake correcting mechanism 20 to make the camera shake correcting function operate. Here, the reason that the camera shake correcting section is made to operate is that image shake is likely to occur due to camera shake caused by setting a low shutter speed for performing a panning shot. Camera shake correcting section 16 does not allow lens group L2 to operate in the direction where the orientation of the digital camera moves, so as not to misjudge the motion of the camera body caused by the panning shot for camera shake. For example, when the photographer moves the orientation of the digital camera in a direction horizontal to the ground (from right to left or from left to right) to shoot a panning shot, camera shake correcting mechanism 20 operates the correction lens group only in the vertical direction. That is, angular velocity sensor 18y in the pitching direction detects only shake added to the vertical direction and microcomputer 3 gives a command to camera shake correcting mechanism 20 to cancel the detected shake. When current is supplied from an outside circuit to coil 24y of pitching move frame 21, a magnetic circuit formed of actuator 27y makes pitching move frame 21 move only in the Y direction perpendicular to optical axis AX. As for a yawing direction, correction lens group L2 does not operate in the yawing direction by not responding to the output from angular velocity sensor 18x and supplying a current to actuator 27x.

In this way, camera shake correcting mechanism 20 moves correction lens group L2 only in the Y direction, so that it is possible to reduce image shake due to camera shake. Furthermore, it is possible to prevent the motion of the digital camera accompanying a panning shot from being misjudged for camera shake.

Returning to the flowchart disclosed in FIG. 7 again, when the photographer fully presses shutter operation section 36 (step 25), photographing processing is carried out, an optical image of a photographing object is formed on image pickup sensor 4 and an image signal is outputted (step 26). This concludes the photographing processing.

As described above, when the digital camera according to this embodiment shoots a panning shot, only a predetermined angular velocity sensor detects a blur. This prevents the motion of the digital camera accompanying a panning shot from being misjudged for camera shake, so that it is possible to take a photograph as if the background flows, which is unique to a panning shot. Furthermore, it is also possible to reduce image shake due to camera shake in the panning shot and obtain an image of good image quality.

Although a case has been described with the present embodiment where a panning shot mode is set before a photograph is taken, the present invention is not limited to this case. For example, it is possible to automatically decide the panning shot mode from the output of an angular velocity sensor.

Embodiment 3

Next, the digital camera according to Embodiment 3 will be explained. Although the digital camera according to the present embodiment has a similar basic configuration to the digital configuration described in Embodiments 1 and 2, the digital camera differs in that photographing sensitivity is set according to the moving speed of the photographing object. Explanations will be focused on points different from Embodiments 1 and 2 below.

When the photographer presses shutter operation section 36 halfway, motion detecting section 100 detects the motion of the photographing object and outputs a detecting vector. Microcomputer 3 calculates moving speed Vh of the photographing object from the outputted detecting vector. Moreover, microcomputer 3 calculates the shutter speed at which no object shake occurs from moving speed Vh and sets photographing sensitivity where photographing can be taken at the calculated shutter speed. For example, when a photographing object moving slowly at a walking speed is photographed, photographing sensitivity is set to ISO sensitivity 100 equivalent, and, when a photographing object moving at a running speed is photographed, photographing sensitivity is set to ISO sensitivity 400 equivalent.

As described above, the digital camera according to the present embodiment sets photographing sensitivity according to the motion of a photographing object, and the photographer can take a photograph of good quality free of object shake without performing complicated operations to set appropriate photographing sensitivity. Furthermore, the photographer does not need to set photographing sensitivity, so that it is possible to provide a digital camera with high-level of convenience without missing a chance to take a photograph.

Although a case has been described with the present embodiment where only photographing sensitivity is set according to the motion of a photographing object, it is also possible to make the camera shake correcting function operate at the same time. It is thereby possible to reduce image quality degradation by camera shake and obtain an image of better image quality. Alternatively, the camera shake correcting function may be operated only when a certain photographing sensitivity is set.

Embodiment 4

The hardware of an image pickup apparatus according to Embodiment 4 of the present invention has a similar basic configuration to the hardware configuration described in FIG. 1 to FIG. 3, and explanations thereof will be omitted.

Figure 8:
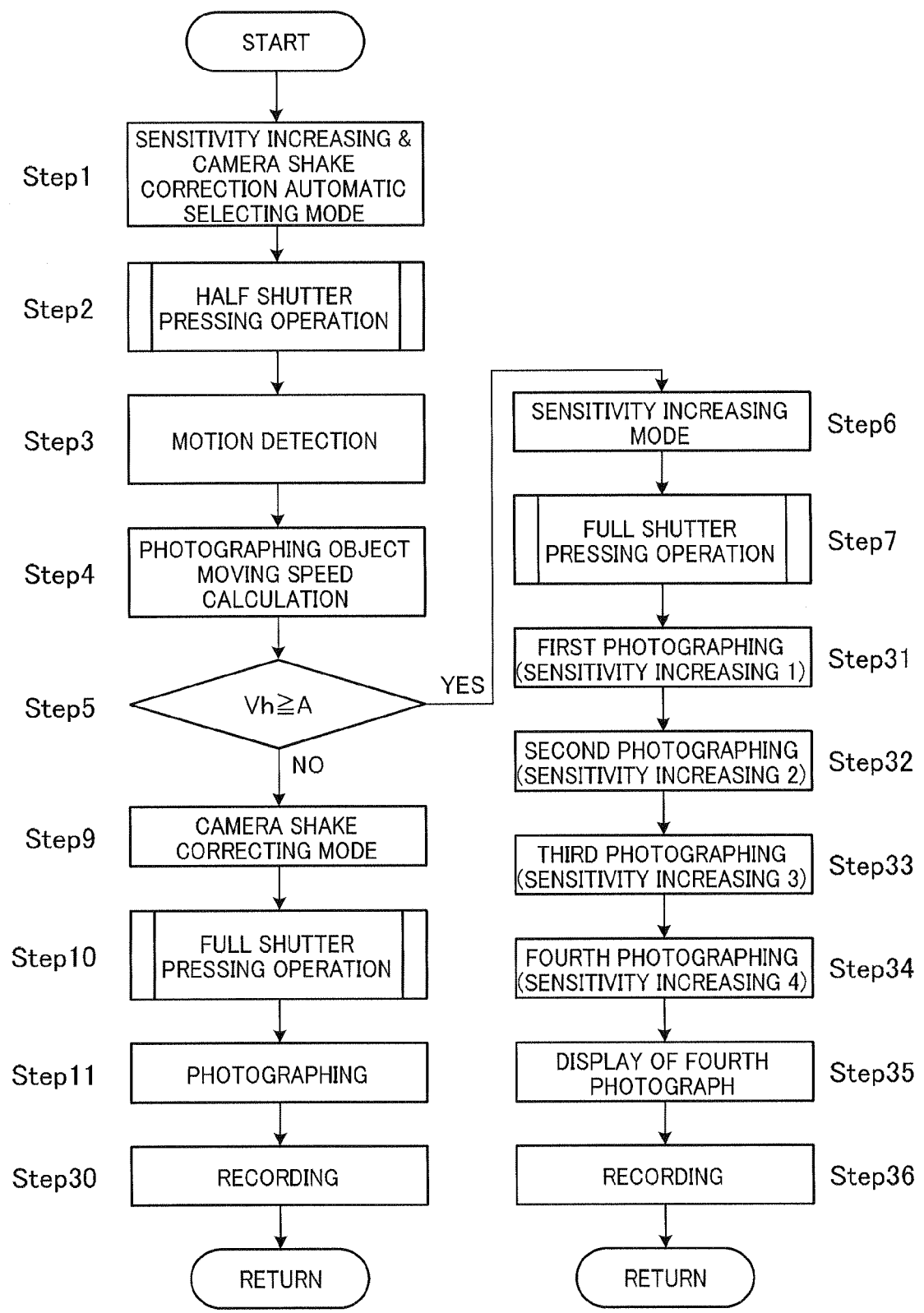
FIG. 8 is a flow chart showing photographing processing by an image pickup apparatus according to Embodiment 4.

FIG. 8 is a flowchart showing photographing processing of digital camera 1 of Embodiment 4 of the present invention and steps of the same processing explained in the flowchart shown in FIG. 6 are assigned the same step numbers and overlapping explanations will be omitted.

Figure 9:
FIG. 9 shows a display example where an image taken in a "camera shake correcting mode" of the image pickup apparatus is displayed on the display section according to Embodiment 4.

At step 11, when photographing processing is performed, a photographing object image is formed on image pickup sensor 4 and an image signal is outputted, and the outputted image signal is displayed on display section 55 shown in FIG. 9.

At step 30, the image signal is recorded in image signal image recording section 12 and the photographing processing is finished.

FIG. 9 illustrates a display example where an image taken in a "camera shake correcting mode" is displayed on display section 55. As shown in FIG. 9, display section 55 displays ISO sensitivity indicating photographing sensitivity with the photographed image.

In this way, when moving speed Vh of the photographing object is smaller than predetermined value A, the camera shake correcting function operates without any photographing sensitivity change. It is thereby possible to reduce camera shake and take a photograph of good image quality.

By contrast, when moving speed Vh at above step 5 is equal to or greater than value A, microcomputer 3 changes the photographing mode to a "sensitivity increasing mode" at step 6. That is, digital signal gain setting section 111 sets a gain so that ISO sensitivity becomes higher than ISO sensitivity set at step 3.

At step 7, when recognizing the photographer has fully pressed the shutter operation section, continuous shooting processing is carried out at and after step 31.

Here, performing continuous shooting processing itself is not significant, but the significance lies in taking a plurality of (here, four) images continuously under different exposure conditions. Four images are continuously taken in one second through one operation by shutter operation section 36. Furthermore, photographing sensitivity is increased every shot. The reason is that moving speed Vh of the photographing object is supposed to increase when a photograph is taken. For example, digital signal gain setting section 111 sets a gain such that photographing sensitivity increases from ISO sensitivity 200 equivalent.

At step 31, when the first photograph is taken, an optical image of the photographing object is formed on image pickup sensor 4 and image pickup sensor 4 outputs an image signal. Digital signal amplification section 110 amplifies the image signal outputted from digital signal processing section 8 by the gain set at ISO sensitivity 200 equivalent. In this case, the shutter speed is set at $1/60$ second.

At step 32, when a second photograph is taken, an optical image of the photographing object is formed on image pickup sensor 4 and image pickup sensor 4 outputs an image signal. Digital signal amplification section 110 amplifies the image signal outputted from digital signal processing section 8 by the gain set at ISO sensitivity 400 equivalent. In this case, the shutter speed is set at 1/125 second.

At step 33, when a third photograph is taken, an optical image of the photographing object is formed on image pickup sensor 4 and image pickup sensor 4 outputs an image signal. Digital signal amplification section 110 amplifies the image signal outputted from digital signal processing section 8 by the gain set at ISO sensitivity 800 equivalent. In this case, the shutter speed is set at 1/250 second.

At step 34, when a fourth photograph is taken, an optical image of the photographing object is formed on image pickup sensor 4 and image pickup sensor 4 outputs an image signal. Digital signal amplification section 110 amplifies the image signal outputted from digital signal processing section 8 by the gain set at ISO sensitivity 1600 equivalent. In this case, the shutter speed is set at 1/500 second.

In this way, in the sensitivity increasing mode, photographing is performed at high sensitivity, that is, higher ISO sensitivity than the ISO sensitivity of the normal mode or camera shake correcting mode. Furthermore, a shorter exposure time is set so that the exposure value at the time is substantially the same.

Figure 10:
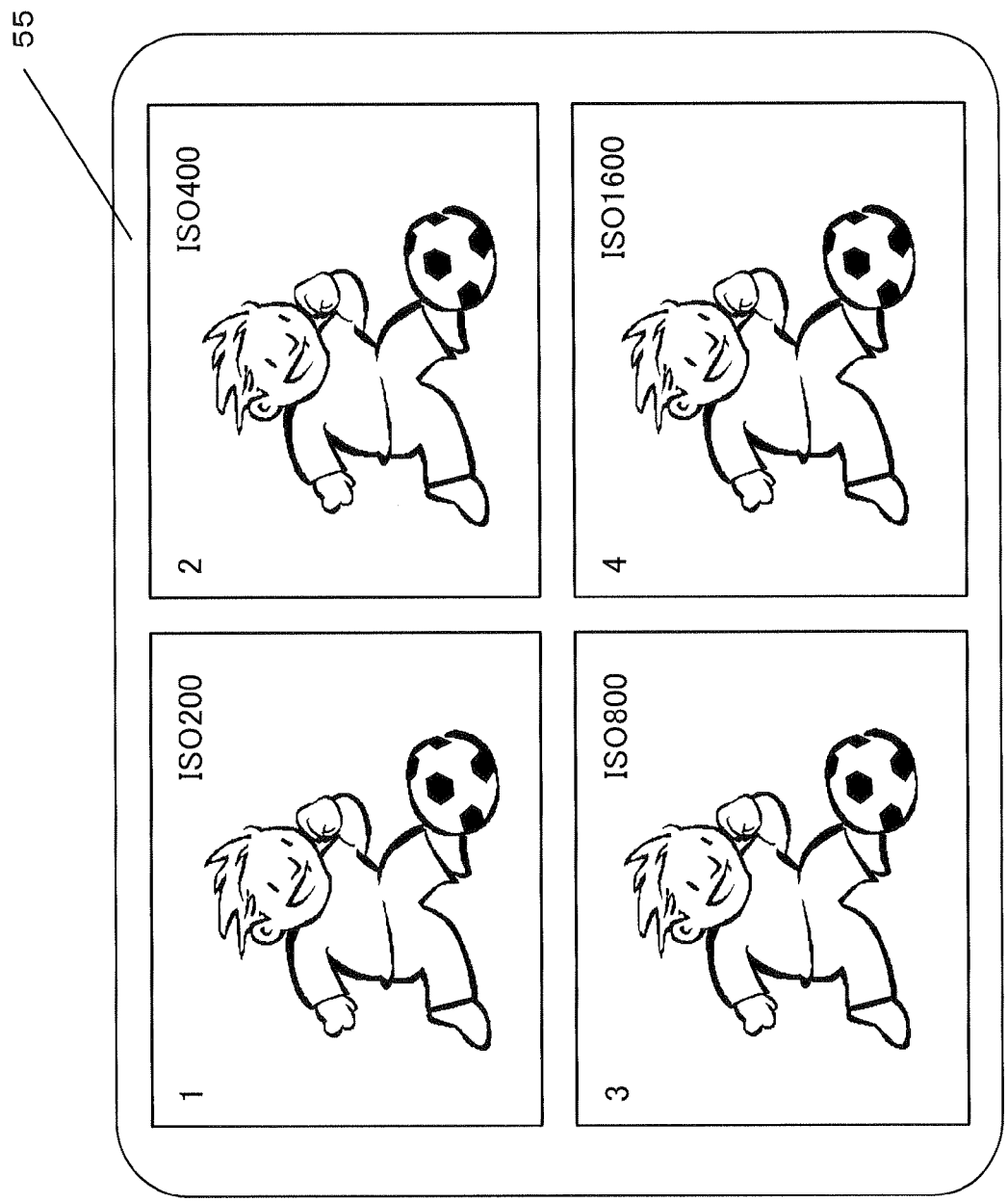
FIG. 10 shows a display example where four images taken continuously after setting an "photographing sensitivity increasing mode" of the image pickup apparatus are displayed on the display section according to Embodiment 4.

The four continuously photographed images are obtained by changing the ISO sensitivity and shutter speed such that the exposure value is maintained, and these images are displayed as thumbnails at step 35 on display section 55 shown in FIG. 10. Furthermore, at step 36, the four continuously photographed image signals are recorded in image recording section 12 and the photographing processing is finished.

FIG. 10 illustrates a display example where the four images continuously photographed after the "sensitivity increasing mode" is set, are displayed on display section 55. As shown in FIG. 10, display section 55 displays thumbnails of a plurality of images continuously photographed under different exposure conditions. Each thumbnail display shows thumbnail display number 1 to 4 and ISO sensitivity.

Although a case will be described with the present embodiment where four images continuously photographed under different exposure conditions are automatically recorded, a method that allows the photographer to select and save arbitrary images can also be employed.

In this way, when moving speed Vh of the photographing object is greater than predetermined value A, photographing sensitivity is set to high sensitivity, so that it is possible to shorten the exposure time and take a photograph at a higher shutter speed and prevent object shake.

Here, at step 2 above, the photographing mode can also be set to the "camera shake correcting mode" before the "half shutter pressing operation". When the photographing mode is set to the "camera shake correcting mode", camera shake correction is also performed in the case of the "half shutter pressing operation." Since camera correction is performed when the motion of the photographing object is detected, it is possible to detect the motion under a condition where the influence of hand shake is less, and improve the accuracy of detecting motion. In other words, this makes it possible to distinguish whether the motion of an image at image pickup sensor 4 is caused by the motion of the photographing object or is influenced by the motion of the camera body due to image shake by the photographer. In this case, at step 9 above, the "camera shake correcting mode" continues as the photographing mode.

As described above, according to the present embodiment, object speed is calculated based on the detected motion of an optical image of a photographing object, whether or not the object speed is equal to or greater than predetermined threshold A is decided, camera shake correcting section 16 is controlled to operate camera shake correction when the object speed is less than threshold A, the gain of digital signal gain setting section 111 is increased to increase ISO sensitivity when the object speed is equal to or greater than threshold A, the shutter speed is increased and the exposure time is shortened, and a plurality of images are photographed continuously under different exposure conditions through one shutter operation. Since images are continuously photographed under a plurality of exposure conditions, even when the moving speed of the photographing object suddenly changes upon shot, there is a high possibility that the plurality of images continuously photographed under the plurality of exposure conditions may include images of good image quality. By contrast, when the object speed is slower than a predetermined value, it is possible to take a good photograph without camera shake by operating the camera shake correcting function. As a result, the photographer can take a photograph easily regardless of the motion of the photographing object.

More specifically, when an optical image of the photographing object moves fast, photographing sensitivity is changed to high sensitivity and photographing is performed for a shortened exposure time at a higher shutter speed. It is thereby possible to prevent image quality degradation due to object shake. Furthermore, when an optical image of the photographing object moves slowly, camera shake correcting section 16 is operated, so that it is possible to prevent image shake due to hand shake and reduce image quality degradation. Therefore, the photographer can take a photograph easily regardless of the motion of the photographing object.

Furthermore, when an optical image of the photographing object moves fast, the photographing sensitivity is automatically changed to high sensitivity, and the photographer does not need to observe the motion of the photographing object to decide whether or not object shake occurs and a high level of convenience is provided.

Furthermore, with the present embodiment, when the detected object speed is equal to or greater than threshold A, photographing sensitivity is changed to high sensitivity. It is thereby possible to prevent the photographer from mistakenly setting photographing sensitivity to high sensitivity even when the photographing object is moving at a speed where object shake does not occur.

Especially, according to the present embodiment, at the time of full shutter pressing operation after the mode is changed to the "sensitivity increasing mode", the photographer can take photographs under a plurality of exposure conditions at once by taking photographs continuously under a plurality of exposure conditions through one shutter operation. In this case, by increasing the photographing sensitivity and shutter speed every time a photograph is taken, it is possible to take a photograph clearly when moving speed Vh of the photographing object increases upon shot. It is also possible to take a photograph, by increasing the photographing sensitivity and shutter speed upon continuous image photographing when the moving speed of a photographing object suddenly changes at the moment the shutter operation section is fully pressed, for example, upon taking a photograph of a child. In this way, by taking photographs continuously under a plurality of exposure conditions and recording the photographs, even when the moving speed of a photographing object suddenly changes upon shot, there is a high possibility where a plurality of images continuously taken under the plurality of exposure conditions includes images of good quality and images with no object shake are recorded. The photographer can select, for example, a thumbnail display number from image storage section 12 where four images taken continuously under different exposure conditions are recorded, and save an optimal image with no object shake.

Here, the relationship between a speed change of a photographing object and photographing sensitivity in the process from "half shutter pressing operation" through "full shutter pressing operation" to photographing will be explained.

Figure 11:
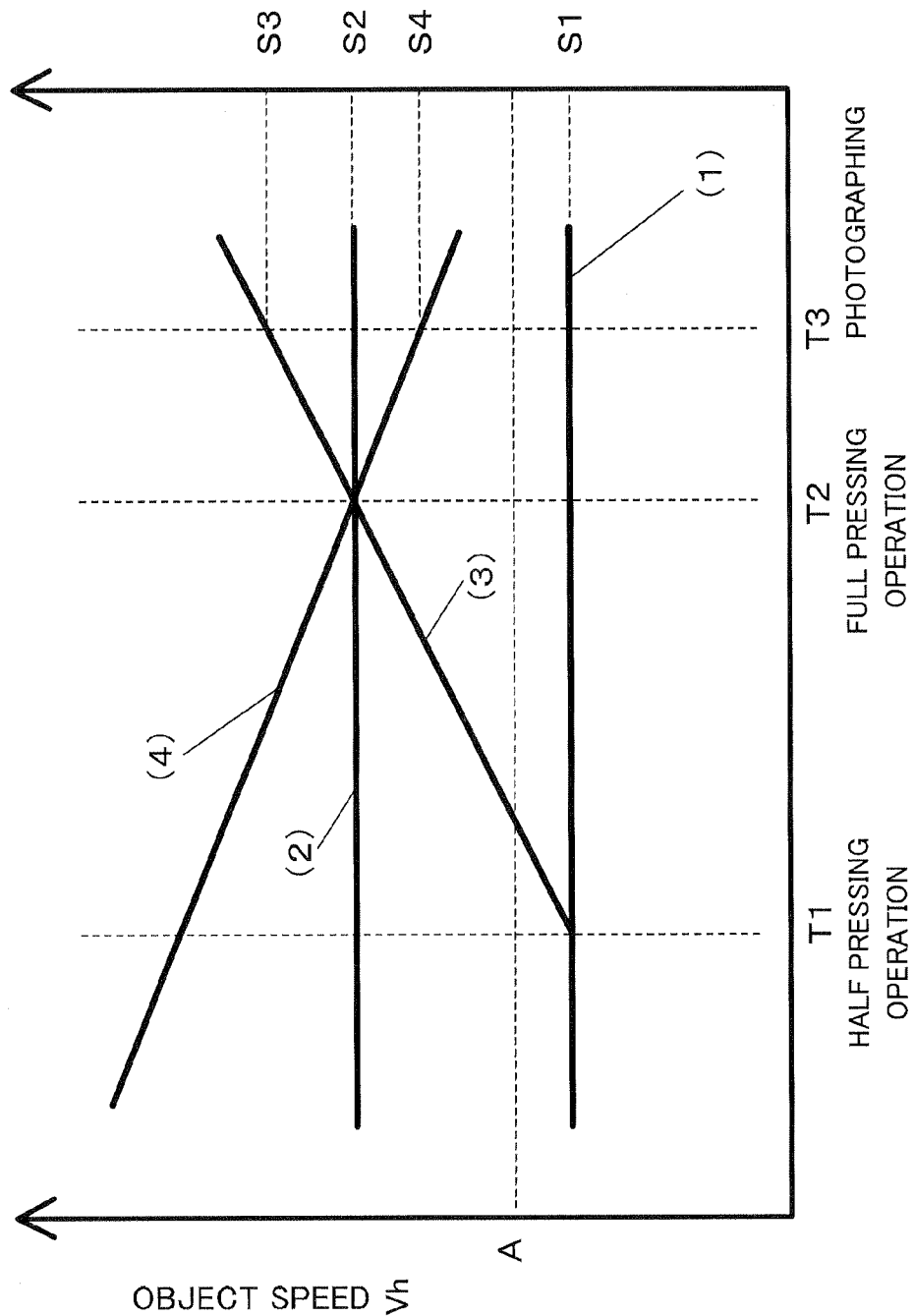
FIG. 11 illustrates a relationship between moving speed Vh of the photographing object of the image pickup apparatus and photographing sensitivity S upon shot according to Embodiment 4.

FIG. 11 illustrates the relationship between moving speed Vh of the photographing object and photographing sensitivity S upon shot. In FIG. 11, T1 is a half pressing operation, T2 is a full pressing operation and T3 is an operation of photographing. Furthermore, S1 to S4 are photographing sensitivity upon shot, and A is a predetermined threshold. Whether or not object speed Vh is equal to or greater than threshold A is decided, and when the object speed is less than threshold A, the speed of camera shake correcting section 16 is increased, and, when the object speed is equal to or greater than threshold A, ISO sensitivity is increased and the shutter speed is increased.

The present embodiment starts motion vector detection coordinated with the "half shutter pressing operation" (step 4 of the flowchart in FIG. 8). Motion vector detection is performed at intervals until immediately before a "full shutter pressing operation" (step 6 and 9 in the flowchart of FIG. 8) and the object speed at the time of the "full shutter pressing operation" is assumed to be final object speed Vh. In this case, assuming that FIG. 11 (1) shows a case where the photographing object does not move, (2) shows a case where the photographing object is moving at a constant speed, (3) shows a case where the photographing object is accelerating at a predetermined rate and (4) shows a case where the photographing object is decelerating at a predetermined rate, the relationship between the speed change of the photographing object and the photographing sensitivity upon the first shot will be described as follows.

(1) When object speed Vh during "half shutter pressing operation" is lower than threshold A and is constant, object speed Vh is lower than predetermined threshold A, and photographing sensitivity is not increased and photographing sensitivity S1 in the normal photographing mode is adopted.

(2) When object speed Vh during "half shutter pressing operation" is higher than threshold A and is constant, photographing sensitivity is increased according to object speed Vh during "full shutter pressing operation" and photographing sensitivity S2 is set here.

(3) When object speed Vh during "half shutter pressing operation" exceeds predetermined threshold A and the speed gradually increases, since object speed Vh gradually increases, the acceleration is calculated and sensitivity is set to photographing sensitivity S3 (S2 less than S3) by predicting the speed increase in the time lag between "full shutter pressing operation" and photographing. Furthermore, when the second or later photographs are taken continuously at this time, the photographing sensitivity and shutter speed are preferably increased every shot.

(4) When object speed Vh during "half shutter pressing operation" exceeds predetermined threshold A and slows down gradually, contrary to case (3) above, when object speed Vh gradually slows down, sensitivity is set to photographing sensitivity S4 (S4 less than S2) by predicting the decrease in the speed. Furthermore, when the second and subsequent photographs are taken continuously at this time, it is preferable to decrease the photographing sensitivity and shutter speed every shot.

Although a case has been described where four photographs are taken per second as an example of continuous shooting, a different number of photographs can also be taken continuously. When, for example, two photographs are taken per second continuously, a photograph can be taken under the conditions of the ISO sensitivity and the shutter speed where the first and third photographs are taken in the flowchart of FIG. 8.

Furthermore, although a case has been described with Embodiment 4 where a plurality of photographs can be taken continuously as an example by operating the shutter operation section once, it is also possible to adopt a system where it is possible to take a picture only when the shutter operation section is operated (pressed).

The above described explanations are illustrations of the preferred embodiments of the present invention and the present invention is not limited to these explanations.

The present invention is applicable to any electronic apparatus which has an image pickup apparatus. For example, the present invention is applicable not only to a digital camera and a video camera but also to an information processing apparatus such as a cellular phone set with a camera, portable information terminal such as PDA (Personal Digital Assistants), personal computer having an image pickup apparatus.

Although a case has been described with the above-described embodiment where, when moving speed Vh of a photographing object is equal to or greater than threshold A, photographing sensitivity is changed to high sensitivity as an example, the camera shake correcting function may also be operated at the same time with changing of photographing sensitivity to high sensitivity.

Furthermore, the present invention needs to be configured to take a plurality of photographs continuously under different exposure conditions, and, before four continuous photographs are taken at high sensitivity, the present invention may also be configured so as to take photographs at ISO sensitivity 100 equivalent which is photographing sensitivity in a normal mode and take a total of five photographs through normal photographing and high sensitivity photographing through one shutter operation.

Furthermore, photographs can also be taken continuously under a plurality of exposure conditions in the camera shake correcting mode through one shutter operation. This allows the photographer to perform photographing under a plurality of exposure conditions at once. In this case, photographing sensitivity for the first photograph becomes the same ISO sensitivity as the ISO sensitivity in the normal mode set in step 3. From the second photograph onward, by increasing photographing sensitivity and shutter speed every shot, it is also possible to take a photograph when moving speed Vh of the photographing object increases upon shot. In a situation, for example, where a photograph of a child is taken, that is, where the moving speed of a photographing object suddenly changes at the moment the shutter operation section is fully pressed, can also be handled sufficiently by taking photographs at an increased shutter speed upon continuous shooting. Furthermore, as described above, the photographing sensitivity and shutter speed may also be changed according to a change in object speed Vh during the "half shutter pressing operation."

Figure 12:
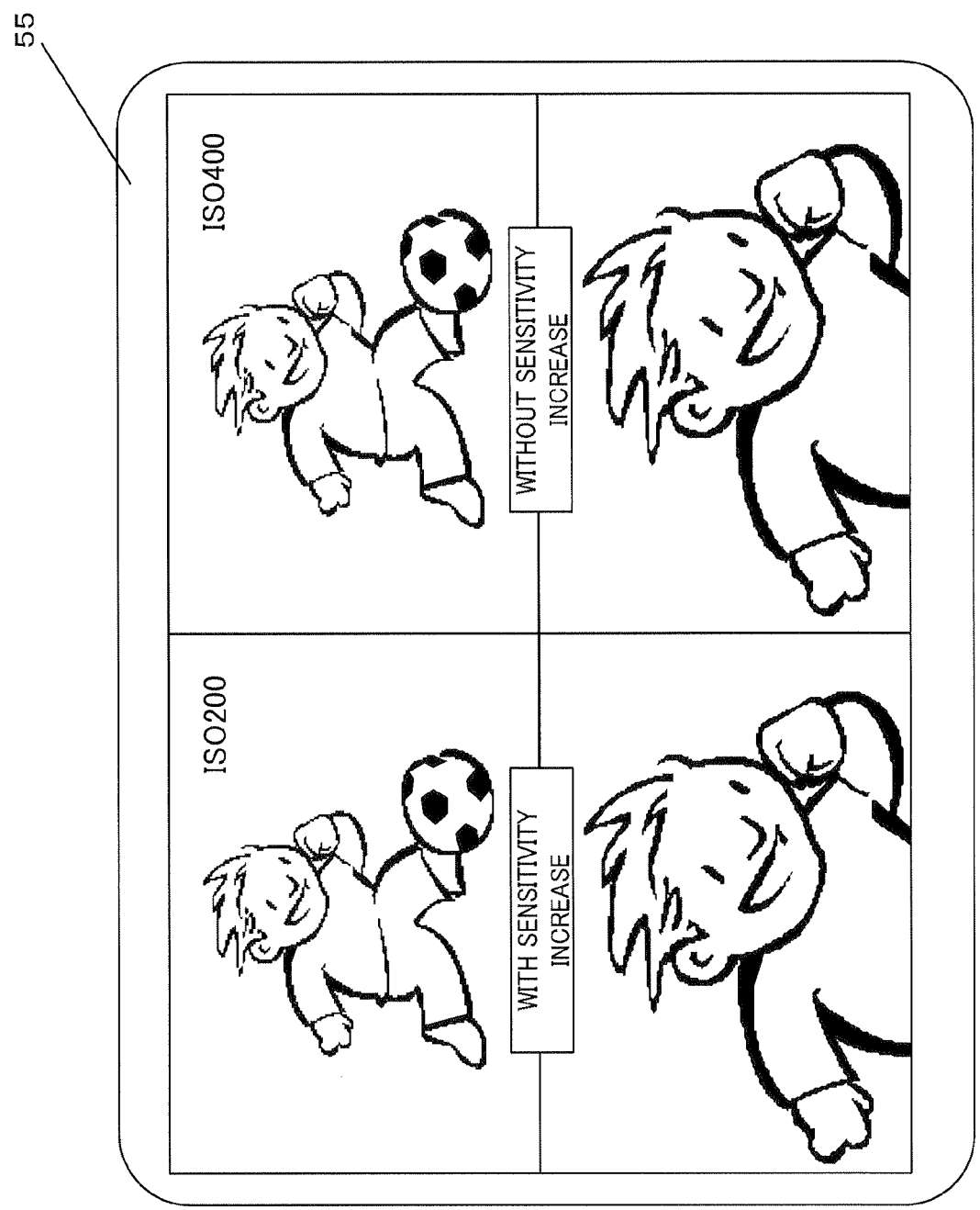
FIG. 12 shows a display example where an image taken with increased sensitivity and an image taken without increased sensitivity after setting an "photographing sensitivity increasing mode" of the image pickup apparatus are displayed on the display section according to Embodiment 4.

Furthermore, as shown in FIG. 12, by continuously taking photographs through one shutter operation and taking photographs with sensitivity increase and without sensitivity increase at different photographing sensitivities, photographs taken in the above two modes and their image quality can be compared in a simple manner immediately after photographing or upon playback. Moreover, a total of four photographed images may also be displayed on display section 55 at the same time by automatically or manually enlarging images using cross operation key 38.

Furthermore, an upper limit may be set for photographing sensitivity to suppress the degradation of photographing image quality.

Furthermore, upon shot using a self-timer, the motion of an optical image of the photographing object may be detected, after shutter operation section 36 is fully pressed, a few seconds before a photograph is taken. It would be so much better to make an LED provided for digital camera 1 blink when the motion is detected, so that the photographing object side can recognize the detection.

Furthermore, although a case has been described where ISO sensitivity 200 equivalent and shutter speed 1/60 second are set as an example of continuous shooting under different exposure conditions, the present invention is not limited to the embodiment, and, when moving speed Vh of the photographing object is higher than the previous moving speed, it may be possible to take a first photograph at higher ISO sensitivity and take photographs continuously by increasing ISO sensitivity every shot.

Furthermore, the configuration of the image pickup optical system and the camera shake correcting section in the above-described embodiments are not limited to above-described configuration. For example, the camera shake correcting section may drive the image pickup sensor in two directions perpendicular to the optical axis with respect to the image pickup optical system. Furthermore, for example, the camera shake correcting section may change the angle of the prism mounted on the front on the photographing object side of the lens barrel or may drive the whole lens barrel, and the configuration is not limited to the configuration of these methods if image shake due to camera shake can be corrected.

Furthermore, it is also possible to use an electronic camera shake correction scheme where an image is corrected by changing the position for extracting the image in the image pickup sensor or a plurality of photographs of the same photographing object are taken at a short shutter speed and these photographs are combined to one image, that is, it is obvious that the scheme is not limited.

Furthermore, although a case has been described with the above-described embodiments where the moving speed of a photographing object is calculated using a motion vector, the present invention is not limited to the embodiments and the moving speed of the photographing object may also be detected using an external sensor separately.

Furthermore, although a case has been described with the above-described embodiments where time of light exposure to the image pickup sensor is controlled by operating the shutter, the present invention is not limited to the embodiments and the exposure time of the image pickup sensor may also be controlled using an electronic shutter or the like.

Furthermore, although the digital camera according to the present embodiment provides an image pickup optical system, the present invention is not limited to the embodiment. As in the case of a single-lens reflex camera system, the present invention is also applicable to an image pickup apparatus where a lens barrel that holds an image pickup optical system and a camera body including an image pickup sensor are used separately. For example, the present invention is applicable to a system in general where a lens barrel that holds an image pickup optical system and a camera body are provided separately and the photographer can use the lens barrel and the camera body in combination.

Furthermore, although the present embodiment uses the term "image pickup apparatus" for ease of explanation, the term can also be an "photographing apparatus", "digital camera" or "image pickup method".

Moreover, the respective components configuring the above-described digital camera, for example, the type of the image pickup optical system, the drive section thereof and the mounting method, and moreover the type of the detecting section or the like are not limited to the aforementioned embodiments.

Furthermore, the image pickup apparatus explained above can also be implemented by a program for making the photographing control method for this image pickup apparatus function. This program is stored in a computer-readable record media.

The present application is based on Japanese Patent Application No. 2006-042379, filed on Feb. 20, 2006, the entire content of which is expressly incorporated by reference herein.

INDUSTRIAL APPLICABILITY

The image pickup apparatus and the lens barrel according to the present invention are suitable for use in a digital still camera and digital video camera where images of high image quality are required, cellular phone having a camera section and PDA or the like.

The invention claimed is:

1. An image pickup apparatus comprising:
an image pickup optical system that forms an optical image of an object to be photographed;
an image pickup sensor that receives the formed optical image, converts the optical image to an electrical image signal and outputs the electrical image signal;
a camera shake correcting section that corrects a shake of the optical image caused by a motion of the image pickup apparatus;
a motion detecting section that is configured to detect a motion of the optical image of the object caused by a motion of the object, wherein the motion detecting section detects the motion of the optical image based on images captured when the camera shake correcting section is correcting the shake of the optical image caused by the motion of the image pickup apparatus; and
a control section that is configured to control an exposure time according to the detected motion of the optical image of the object.

2. The image pickup apparatus according to claim 1, further comprising:
a camera shake correction control section that decides whether or not to operate the camera shake correcting section according to the motion of the optical image of the object.

3. The image pickup apparatus according to claim 2, further comprising:
an object speed deciding section that calculates an object speed based on the motion of the optical image of the object detected by the motion detecting section, and decides whether or not the object speed is equal to or higher than a predetermined threshold, wherein:
the control section operates the camera shake correcting section upon taking a shot, when the object speed is lower than the threshold.

4. The image pickup apparatus according to claim 2, wherein:
the image pickup apparatus enables a panning shot; and
the camera shake correcting section operates the camera shake correcting section upon taking a shot in a panning shot mode.

5. The image pickup apparatus according to claim 1, further comprising:
an object speed deciding section that calculates an object speed based on the motion of the optical image of the object detected by the motion detecting section, and decides whether or not the object speed is equal to or higher than a predetermined threshold,
wherein:
when the object speed is equal to or higher than the threshold, the control section takes a photograph in a shorter exposure time than when the object speed is lower than the predetermined threshold.

6. The image pickup apparatus according to claim 5, wherein the control section operates the camera shake correcting section upon taking a shot, when the object speed is lower than the threshold.

7. The image pickup apparatus according to claim 5, wherein the control section takes a photograph a plurality of times, using a different exposure time or a different amplification factor for the image signal at every shot.

8. The image pickup apparatus according to claim 7, wherein the control section takes later photographs in shorter exposure times or at higher amplification factors.

9. The image pickup apparatus according to claim 5, wherein the control section controls the exposure time or an amplification factor for the image signal, according to a predicted object speed upon taking a shot based on the calculated object speed.

10. The image pickup apparatus according to claim 1, further comprising:
an object speed deciding section that calculates an object speed based on the motion of the optical image of the object detected by the motion detecting section, and decides whether or not the object speed is equal to or greater than a predetermined threshold, wherein:
when the object speed is equal to or greater than the threshold, the control section takes a photograph at a higher amplification factor for the image signal than when the object speed is lower than the threshold.

11. The image pickup apparatus according to claim 10, wherein, when the object speed is lower than the threshold, the control section operates the camera shake correcting section upon taking a shot.

12. The image pickup apparatus according to claim 5, further comprising a threshold input section that externally sets the threshold in the control section.

13. The image pickup apparatus according to claim 10, further comprising a threshold input section that externally sets the threshold in the control section.

14. The image pickup apparatus according to claim 6, wherein, when the object speed is lower than the threshold, the control section does not change an amplification factor of the image signal.

15. The image pickup apparatus according to claim 11, wherein, when the object speed is lower than the threshold, the control section does not change an amplification factor of the image signal.

16. An image pickup apparatus used in combination with a lens barrel which mounts a camera shake correcting section that corrects a shake of an optical image caused by a motion of the image pickup apparatus, the apparatus comprising:
an image pickup sensor that receives a formed optical image, converts the image to an electrical image signal and outputs the converted signal;
a motion detecting section that is configured to detect a motion of the optical image of an object to be photographed caused by a motion of the object, wherein the motion detecting section detects the motion of the optical image based on images captured when the camera shake correcting section is correcting the shake of the optical image caused by the motion of the image pickup apparatus; and
a control section that is configured to control an exposure time in accordance with the detected motion of the optical image of the object.

* * * * *